(12) United States Patent  
McClure et al.

(10) Patent No.: US 8,261,524 B1  
(45) Date of Patent: Sep. 11, 2012

(54) PICKUP TINE BAR LINKAGE

(75) Inventors: John R. McClure, New Holland, PA (US); David M. DeChristopher, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/080,604

(22) Filed: Apr. 5, 2011

(51) Int. Cl.  
*A01D 43/02* (2006.01)  
*A01D 89/00* (2006.01)

(52) U.S. Cl. ......................................................... 56/364

(58) Field of Classification Search ................... 56/364, 56/341, 400, 16.1  
See application file for complete search history.

(56) References Cited

U.S. PATENT DOCUMENTS

| | | | |
|---|---|---|---|
| 3,048,259 A | 8/1962 | Jarrell | |
| 3,199,604 A | 8/1965 | Lorenzen et al. | |
| 3,511,362 A * | 5/1970 | Gaeddert et al. | 198/693 |
| 4,409,891 A | 10/1983 | Naaktgeboren | |
| 4,498,278 A | 2/1985 | Friesen | |
| 4,525,991 A | 7/1985 | Naaktgeboren | |
| 6,237,695 B1 * | 5/2001 | Pierce et al. | 172/79 |
| 6,327,840 B1 * | 12/2001 | Rumph | 56/341 |
| 6,640,527 B2 * | 11/2003 | Farley et al. | 56/12.4 |
| 6,948,300 B1 * | 9/2005 | Bandstra et al. | 56/341 |
| 6,986,241 B2 | 1/2006 | Beck | |
| 7,204,074 B2 * | 4/2007 | Bandstra et al. | 56/341 |
| 7,296,393 B1 | 11/2007 | McClure et al. | |
| 7,370,462 B2 * | 5/2008 | Kraus et al. | 56/341 |
| 2005/0210855 A1 * | 9/2005 | Bandstra et al. | 56/341 |

FOREIGN PATENT DOCUMENTS

DE 3426156 A1 1/1986

* cited by examiner

*Primary Examiner* — Arpad Fabian-Kovacs  
(74) *Attorney, Agent, or Firm* — Patrick M. Sheldrake

(57) ABSTRACT

An tine reel for a round baler pickup unit allows tine position to be altered dependant of rotational position of the tine reel and the lateral position of the tine on the pickup. A plurality of tine bars are mounted on the tine reel, with separate tine bars provided for the centrally located tines and the outboard located tines. A linkage connects the centrally located inboard tine bars to the outboard tine bars so that rotation of the outboard tine bars by a tine reel cam and cam follower mechanism is transferred to the inboard tine bar without the need for a second cam or second cam follower mechanism. The linkage configuration is adjusted to provide optimal tine extension position for both the centrally located and the outboard located tines.

19 Claims, 7 Drawing Sheets

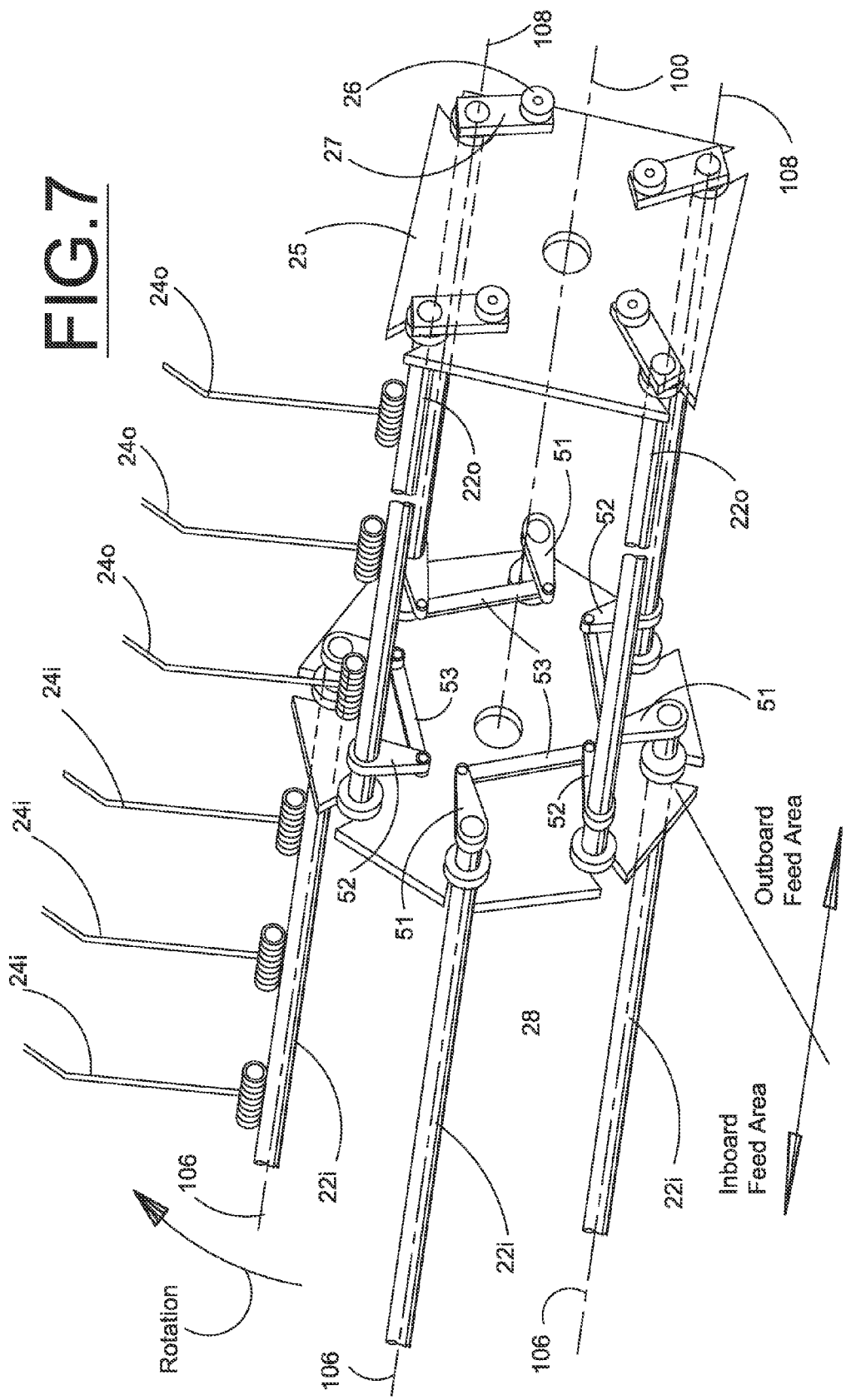

PICKUP TINE BAR LINKAGE

BACKGROUND OF THE INVENTION

The present invention relates generally to a baler for forming cylindrical bales of crop material, commonly referred to as a round baler, and more particularly to an improvement in a crop pickup apparatus for a round baler having lateral converging apparatus working in conjunction with the pickup that is wider than the bale forming chamber inlet.

Round balers rely on a pickup apparatus with a set of tines that engage a windrow of crop material on the ground and lift it upwardly and then urge it rearwardly to a transverse infeed opening into a bale-forming chamber. Pressure to increase efficiency in crop packaging operations has resulted in the prevalence of crop pickup units that are significantly wider than the bale forming chamber into which the crop material is fed. A wider pickup allows the baler to handle wider crop windrows and also results in better crop fill at the lateral extremes of the resultant bale. Historically, wide pickups have incorporated augers situated at the extremes of the pickup width to converge the crop laterally inwardly to achieve a width of the crop mat being fed into the bale chamber that is approximately the same as the chamber width. Longitudinal placement of the converging augers requires an elongated feed table, increasing the distance the crop must travel between the pickup tines and the bale chamber inlet opening. A secondary feed mechanism, such as a stuffer or rotor, is often necessary to convey the converged crop mat along the lengthened feed table and into the bale chamber.

Although quite effective, secondary feed mechanisms add complexity and cost. Without them, the potential for clogging the bale chamber infeed opening increases. Efforts to eliminate the secondary feed mechanism have focused on minimizing the distance between the pickup tines and the crop inlet opening. Reducing the feed table length to eliminate the need for a secondary feed mechanism requires that tine movement on the tine reel be optimized for maximum crop movement efficiency and to reposition tines depending on rotational position to prevent their contacting the more closely positioned converging augers. While this approach reduces the need for a secondary feed mechanism, the benefit may be offset by the increased complexity in the tine position management mechanism within the pickup apparatus.

It would be a great advantage to provide a simple tine position management mechanism for a round baler pickup unit that eliminates the need for a secondary pickup feed mechanism, reduces the required clearance between a tine reel and one or more crop converging augers to overcome the above problems and limitations.

SUMMARY OF THE INVENTION

Accordingly, the present invention, in any of the embodiments described herein, may provide one or more of the following advantages:

It is an object of the present invention to provide a variable position tine reel for a pickup unit on a round baler that extends tines situated ahead of a bale chamber inlet as far as possible toward the bale chamber inlet to enhance crop movement toward the inlet opening.

It is a further object of the present invention to provide a variable position tine reel for a pickup unit on a round baler that retracts the tines forwardly adjacent to outboard converging augers disposed on the pickup unit as far as possible to clear the augers and allow auger diameter to be maximized.

It is a further object of the present invention to provide a variable position tine reel for a pickup unit on a round baler that enables tine extension for laterally central tine positions as well as laterally outboard tine positions to be individually optimized to improve crop flow at the transition between the crop converging augers and the floor roll situated in the crop inlet opening and reduce the likelihood of plugging.

It is a still further object of the present invention to provide a variable position tine reel for a pickup unit on a round baler that is light in weight to improve the ground-following capabilities of the pickup unit.

It is a still further object of the present invention to provide a variable tine position tine reel for a round baler that is durable in construction, inexpensive of manufacture, carefree of maintenance, easily assembled, and simple and effective to use.

These and other objects are achieved by providing an improved tine reel for a round baler pickup unit that allows tine position to be altered dependant of rotational position of the tine reel and the lateral position of the tine on the pickup. A plurality of tine bars are mounted on the tine reel, with separate tine bars provided for the centrally located tines and the outboard located tines. A linkage connects the centrally located inboard tine bars to the outboard tine bars so that rotation of the outboard tine bars by a tine reel cam and cam follower mechanism is transferred to the inboard tine bar without the need for a second cam or second cam follower mechanism. The linkage configuration is adjusted to provide optimal tine extension position for both the centrally located and the outboard located tines.

BRIEF DESCRIPTION OF THE DRAWINGS

The advantages of this invention will be apparent upon consideration of the following detailed disclosure of the invention, especially when taken in conjunction with the accompanying drawings wherein:

FIG. 7 is a partial perspective view of the tine reel assembly shown in FIGS. 5 and 6.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
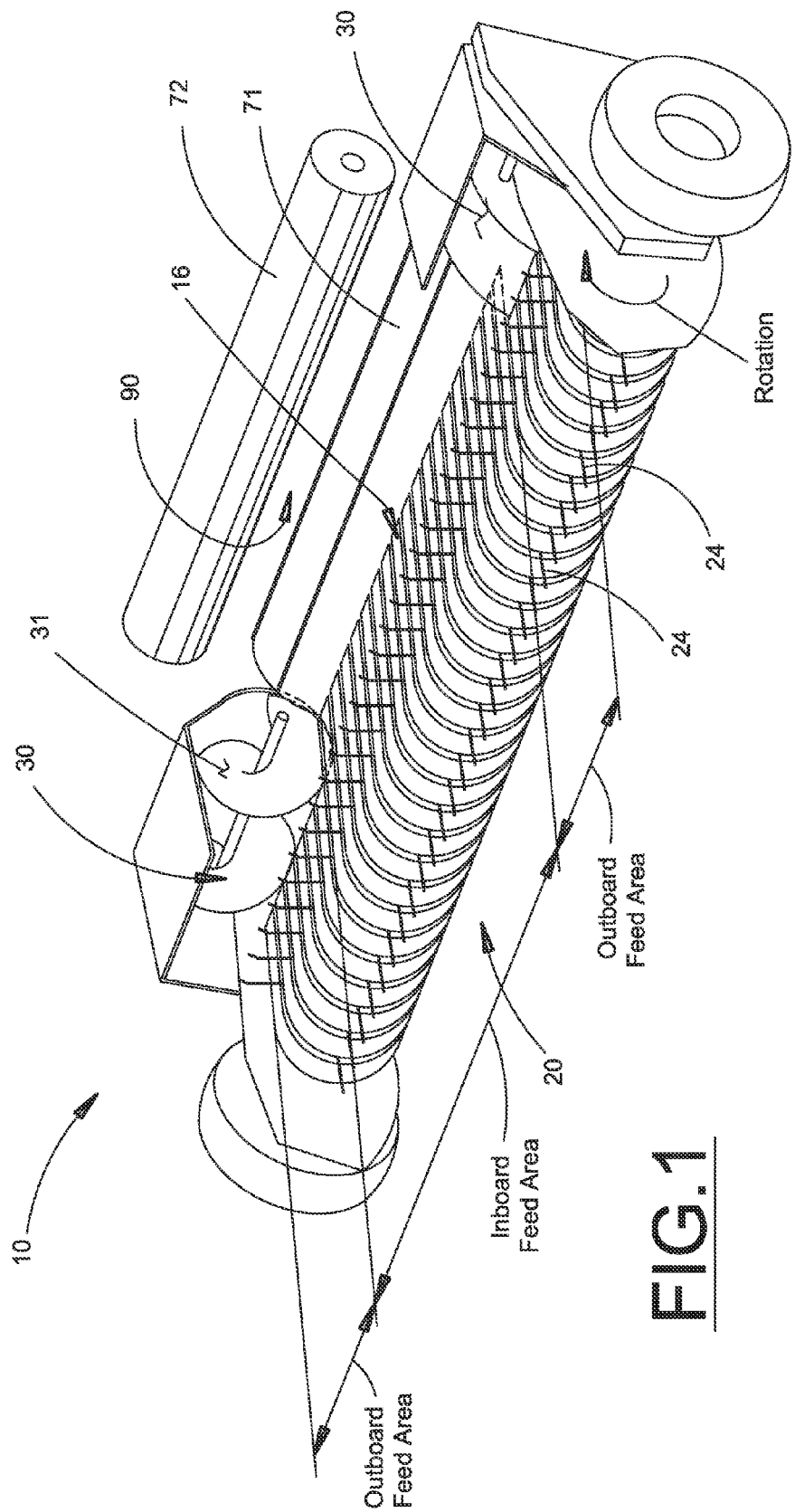
FIG. 1 shows a pickup unit for an agricultural round baler of the type on which the present invention is useful.

FIG. 1 illustrates a conventional crop pickup assembly 10 for a round baler. During field operation, the pickup assembly picks up crop material, such as hay, from the ground and feeds it into a fixed or adjustable chamber on the baler where it is rolled up to form a compact cylindrical package of hay. While still inside the chamber, the formed package is wrapped in its compact form by net, twine, or the like, prior to being ejected as a bale onto the ground for subsequent handling. The operation of pickups and round balers is well-known and is shown by way of example in U.S. Pat. No. 5,044,272, issued on Sep. 3, 1991 to Richard E. Jennings, the entirety of which is incorporated herein by reference.

Figure 2:
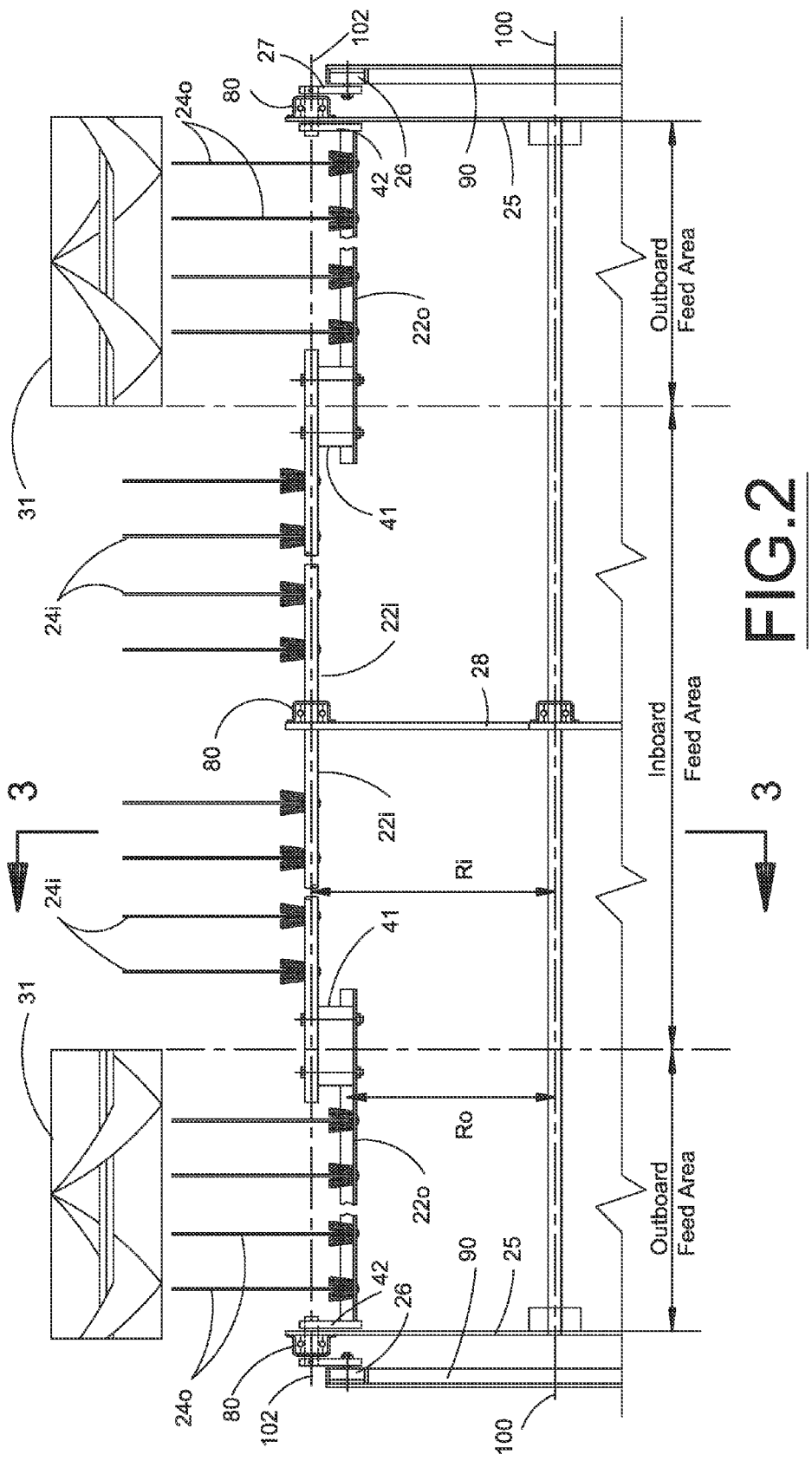
FIG. 2 is a plan view of the tine reel assembly shown in FIG. 1 showing the relationship of the tine bars and pickup tines to the baler when incorporating one embodiment of the present invention.

In baler applications where the pickup assembly 10 is wider than the inlet opening 90, a crop converging apparatus 30 is typically provided to laterally urge crop from the portions of the pickup assembly outboard of the inlet opening inwardly toward the inlet opening 90 of the bale chamber, shown as the inboard feed area in FIGS. 1 and 2. The converging apparatus 30 urges crop material laterally inwardly to establish a mat of crop material having a width matching that of the inlet opening 90 and desired bale width, typically around four or five feet. In the embodiment shown herein, the converging apparatus 30 comprises a pair of augers 31 arranged on opposing outboard ends of the crop pickup assembly.

Now referring to FIGS. 1 through 4, the pickup assembly 10 is shown to include a plurality of pick up tines 24 connected to a rotating tine reel 20 which engages and lifts crop material from the ground to an upper surface of the pickup assembly, referred to as the feed table 16, for rearward movement toward the inlet opening 90 to bale chamber, vertically bounded by floor roll 71 and starter roll 72 and laterally bounded by the side walls of the bale forming chamber. The tines 24 are connected to a plurality of tine bars 22, which are in turn connected to the tine reel 20 by a plurality of tine spiders 25, 28 in a manner causing the tine bars 22 to revolve around a tine reel axis 100 in the direction shown when powered by a drive mechanism in the baler. As the tine reel 20 revolves, individual tine bars 22 may be rotated to vary the angle at which the tines 24 extend from the tine bars 22. Tine bar rotation is accomplished by the inclusion of one or more cam followers 26 engaging a cam 90 and connected to the tine bars 22 in a manner to rotate the tine bars 22 as the tine reel 20 revolves in order to alter the angle of the tines 24. Tine positioning is desirable to improve crop pickup from the ground, to accelerate the crop material, and to provide clearance between the tines and closely positioned portions of the baler or pickup assembly.

The tine reel 20 is laterally configured into three adjacent zones: an inboard feed area and two outboard feed areas (see FIGS. 1 and 2). The inboard feed area is located immediately ahead of the floor roll 71. The inboard feed area is laterally bounded on each side by an outboard feed area, each outboard feed area being located immediately ahead of the converging augers 31. Tine reel 20 is configured to produce optimal tine orientation for the inboard feed area and the outboard feed areas. Due to the relative differences in proximity of the tine reel to the floor roll 71 and the converging augers 31, the tips of the inboard tines 24$i$ and the outboard tines 24$o$ must travel slightly different paths. Tine reel 20 thus comprises a plurality of tine bars 22 which are positioned generally parallel to and spaced about the tine reel axis 100. The tine bars 20 are held in position by a pair of generally opposing outboard spiders 25 and one or more intermediate spiders 28. Each tine bar 22 is connected to the spiders 25, 28 by one or more bearings 80 which allows the tine bar 22 to rotate about a tine bar axis 102. A cam link 27 and cam follower 26 connect at one or both ends of each tine bar 22 and allow each tine bar to be rotated about tine bar axis 102, controlled by the profile of cam 90, as the tine reel 20 rotates about tine reel axis 100. In the embodiment shown in FIGS. 2 through 4, there are four tine bars 22 in the tine reel 20 providing an acceptable balance between tine reel pickup efficiency, weight, and complexity.

Figure 3:
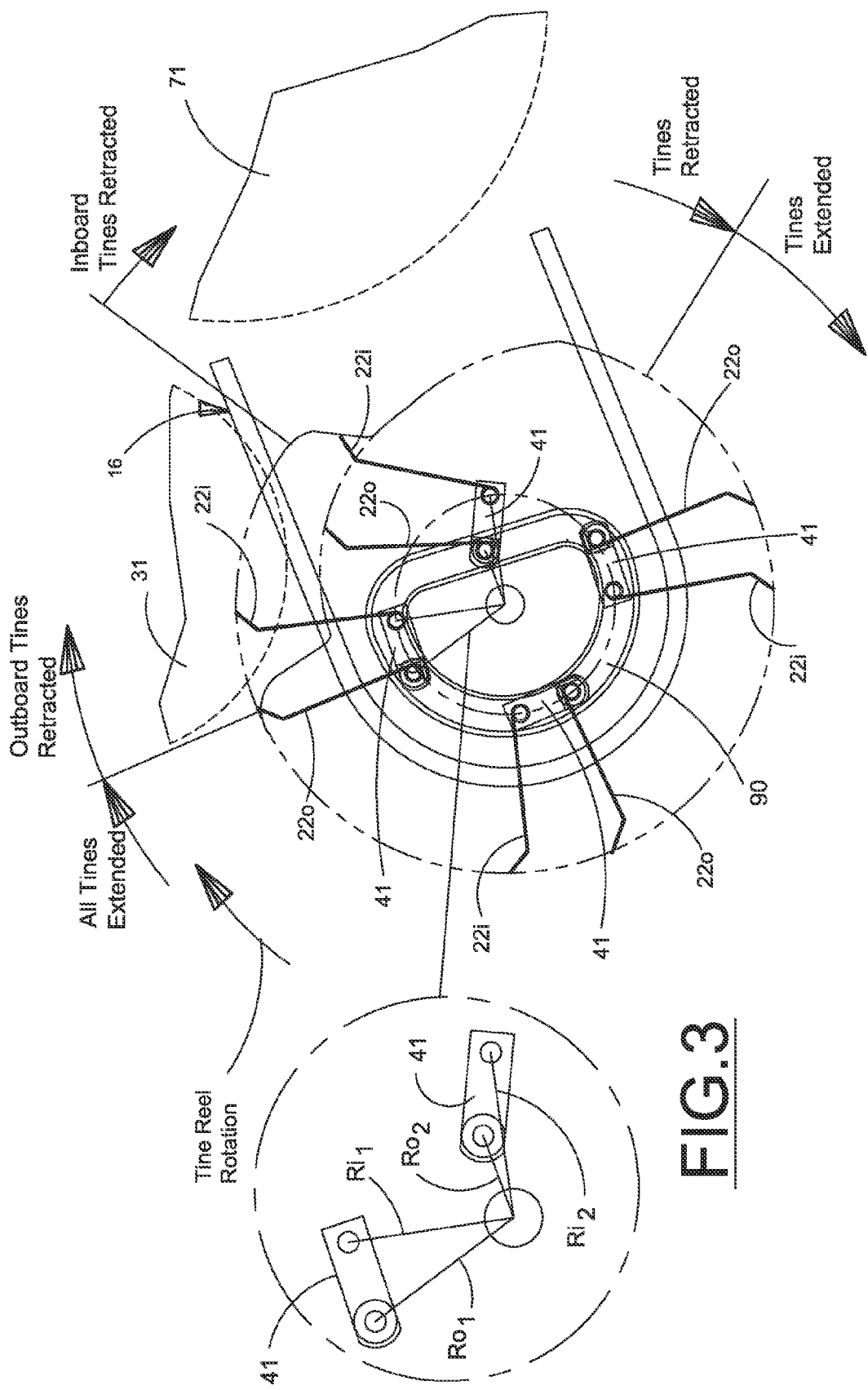
FIG. 3 is a section view of the tine reel assembly of FIG. 2 taken along cut line 3-3.
Figure 4:
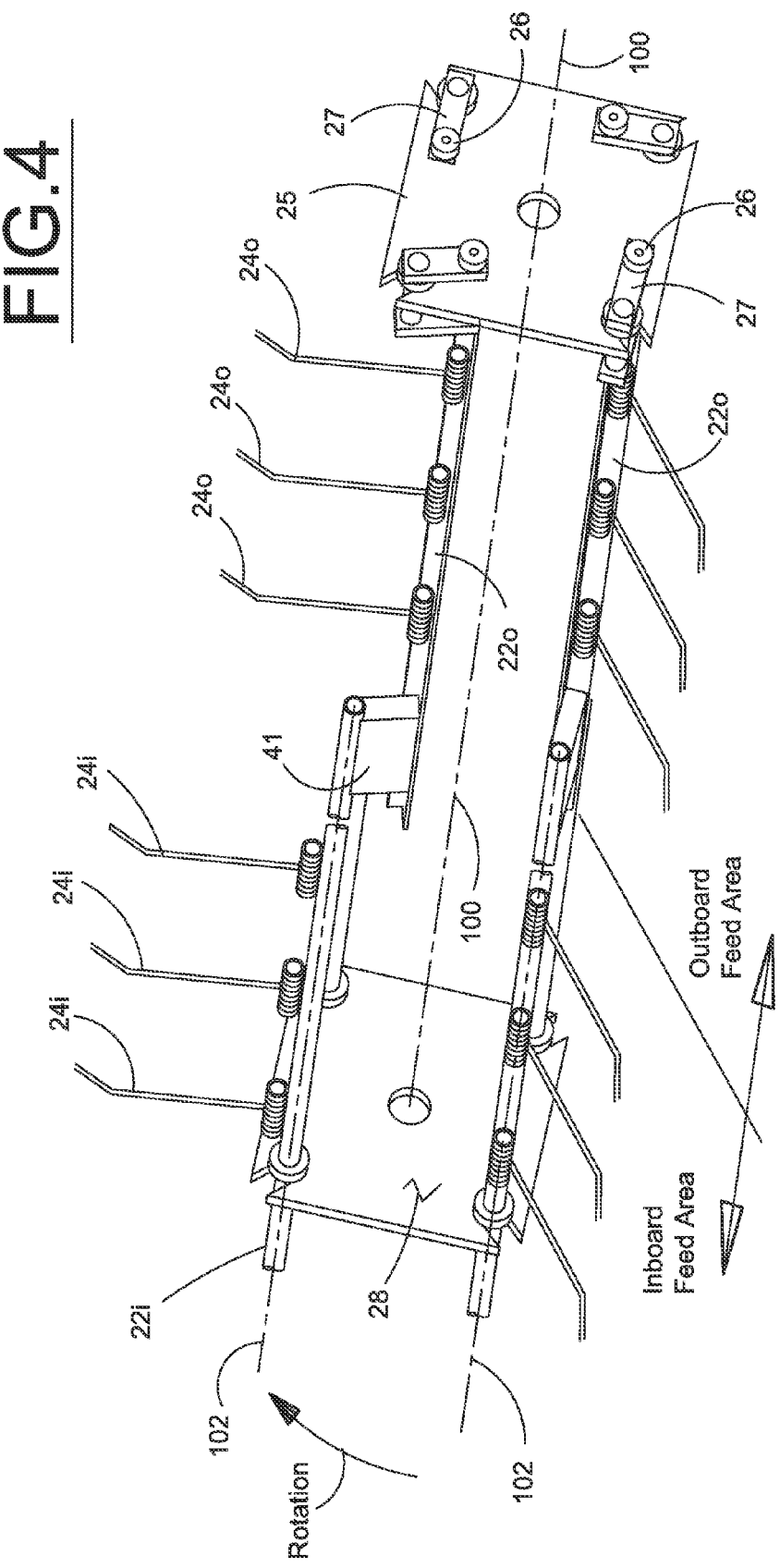
FIG. 4 is a partial perspective view of the tine reel assembly shown in FIGS. 2 and 3.

Each tine bar 22 further comprises an inboard tine bar portion 22$i$ and at least one outboard tine bar portion 22$o$. It is preferable to provide a symmetric arrangement with an outboard tine bar portion 22$o$ on each end of the inboard tine bar portion 22$i$. The inboard tine bar portion 22$i$ is aligned on the tine bar axis 102 for rotation thereabout. The outboard tine bar portions 22$o$ are eccentrically offset from the inboard tine bar portion 22$i$ by inboard spacer links 41 and outboard spacer links 42 so that the outboard tine bar portions 22$o$ partially orbit the tine bar axis 102 as the tine bar 22 is rotated. The spacer links 41, 42 are solid connections between the inboard tine bar portion 22$i$ and the outboard tine bar portions 22$o$ creating an offset crank arrangement in each tine bar 22. The eccentric offset, best illustrated in FIG. 2, allows the outboard tines 24$o$ to be retracted to a greater extent and to a different orbital track than the inboard tines 24$i$. Variations between the inboard and outboard tine orbital tracks are best illustrated in FIG. 3.

The inboard and outboard tine bar portions 22$i$, 22$o$ are generally equally spaced from the tine reel rotational centerline 100 during the portion of the tine reel rotation for which the tines are fully extended. These are illustrated and radii $Ro_1$ and $Ri_1$ in FIG. 3. As the tine bar 22 orbit approaches the converging augers 31 and floor roll 71, the cam 90 causes the tine bar 22 to rotate. The effect of the rotation for the inboard tine bar portion 22$i$ is to fold the inboard tines 24$i$ rearwardly relative to the direction of tine reel rotation. However, due to the eccentric mounting of the outboard tine bar portions 22$o$, the effect of the rotation is not only to fold the outboard tines 24$o$ rearwardly, but also to reposition the outboard tine bar portions 22$o$ closer to the rotational centerline of the tine reel 100, illustrated as radii $Ro_2$ and $Ri_2$ in FIG. 3. The inboard tine bar portion 22$i$ is positioned to lead the outboard tine bar portion 22$o$ in the direction of orbital rotation of the tine reel 20 which also allows the inboard tines 24$i$ to extend further rearwardly (see FIG. 3) before the tine bar rotation begins to fold them inwardly to clear the floor roll 71. This tine movement may be accomplished by a single cam 90 or as is common in wider pickup units, two like cams wherein one is located on each outboard end of the tine reel 20.

Figure 5:
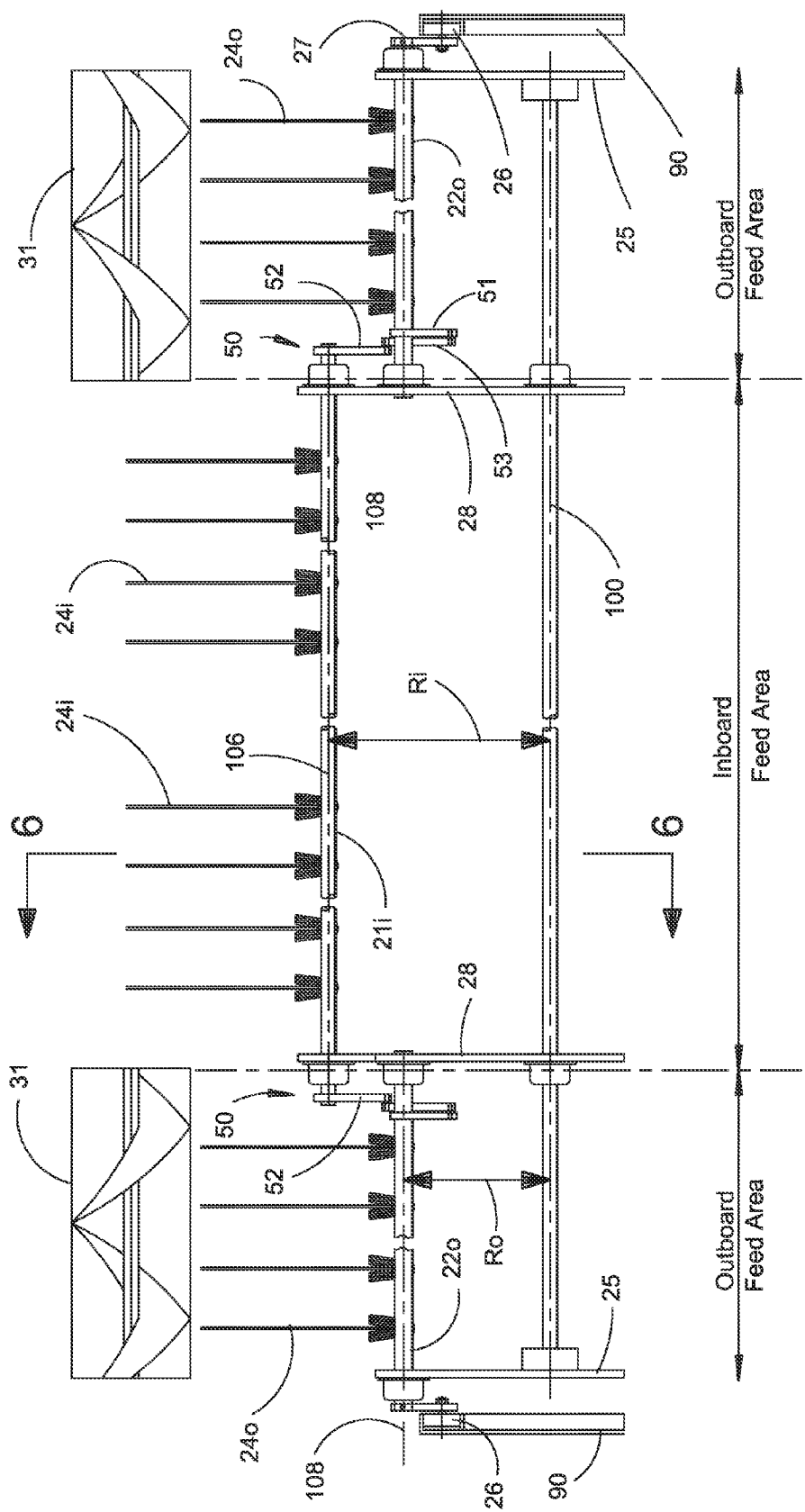
FIG. 5 is a plan view of the tine reel assembly shown in FIG. 1 showing the relationship of the tine bars and pickup tines to the baler when incorporating a second embodiment of the present invention.
Figure 6:
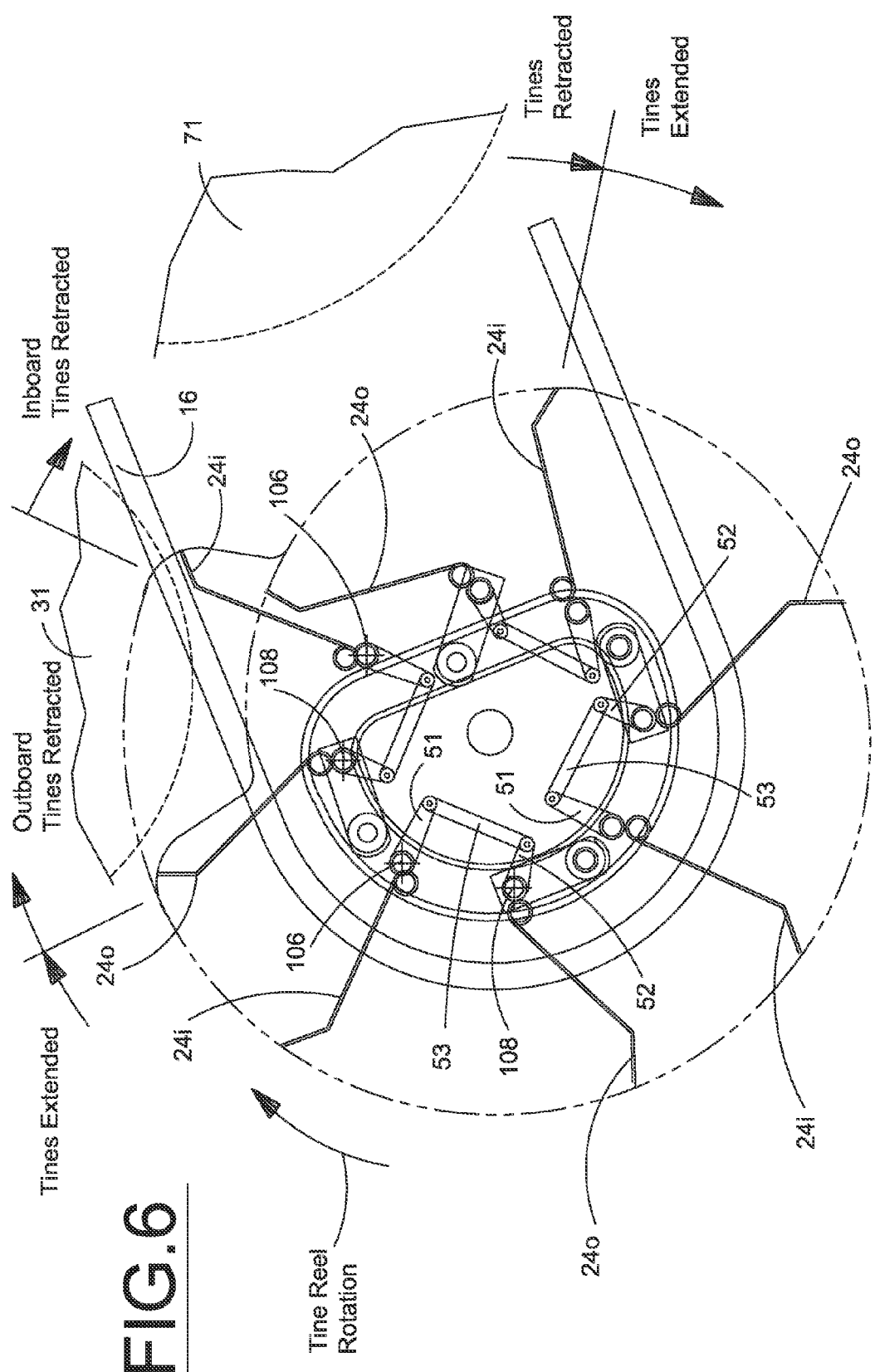
FIG. 6 is a section view of the tine reel assembly of FIG. 5 taken along cut line 6-6.

A second embodiment of the present invention is illustrated in FIGS. 5 through 7. Tine reel 20 is shown having a plurality of tine bars 22 to which are connected a plurality of tines 24. The tine bars 22 are held in position by a pair of generally opposing and spaced-apart outboard spiders 25 and one or more intermediate spiders 28 positioned therebetween. The tine bars 22 are aligned generally parallel to the tine reel axis 100. Each tine bar 22 further comprises an inboard tine bar portion 22*i* and at least one outboard tine bar portion 22*o*. It is preferable to provide a symmetric arrangement with an outboard tine bar portion 22*o* on each end of the inboard tine bar portion 22*i*. Each inboard and outboard tine bar portion is individually journaled to the tine spiders. Inboard tine bar portion 22*i* is supported by bearings 81 located on intermediate spiders 28 such that the tine bar portion 22*i* may rotate about inboard axis 106. Outboard tine bar portions 22*o* are supported on bearings 82, at least one of which is disposed on outboard spider 25, and arranged so that the outboard tine bar portions 22*o* may rotate about outboard axis 108.

The inboard 106 and outboard axes 108 are generally parallel to and radially equally spaced from the tine reel rotational centerline 100 during all orbital positions of the tine reel 20 rotation. Referring specifically to FIG. 5, the tine bar spacing is shown wherein Ro is equal to Ri. The inboard and outboard tine bar portions are angularly separated about the circumference of the tine reel as illustrated in FIGS. 6 and 7. A tine bar connection linkage 50 is provided to rotatably connect adjacent inboard 22*i* and outboard tine bar portions 22*o* to synchronize their rotation. Cam follower 26 and idler arm 27 are connected to an outboard end of the outboard tine bar portion 22*o* to engage cam 90 and cause the desired rotation of the outboard tine bar portion 22*o* as the tine reel 20 rotates. A single cam 90 profile is used, though like cams may be placed on each outboard end of very wide tine reels to maintain operating stresses reasonably low. The rotational input is transferred to the inboard tine bar portion by the linkage 50, which comprises a pair of idler arms 51, 52 and a tie link 53. The relative lengths of the idler arms 51, 52 may be varied to alter the relative rotation of the inboard to the outboard tine bar portions thereby allowing the degree of tine folding to be altered from the inboard feed area to the outboard feed area without requiring a separate cam.

The inboard tine bar portion 22*i* is positioned to lead the outboard tine bar portion 22*o* in the direction of orbital rotation of the tine reel 20 which also allows the inboard tines 24*i* to extend further rearwardly (see FIG. 6) before the tine bar rotation begins to fold them inwardly to clear the floor roll 71. The angular displacement between the inboard and outboard tine bar portions 22*i*, 22*o*, respectively, results in similar tine movements offset slightly due to the angular separation between the inboard and outboard tine bar portions. The result is that tine retraction for inboard tine 24*i* begins to occur as the tine tips are adjacent to the inward ends of the converging augers 31 while the outboard tines 24*o* have not yet reached the augers 31.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A tine reel for a crop pickup apparatus for a round baler, the baler having a bale chamber inlet configured to receive crop material from the pickup apparatus, the pickup apparatus being wider than the bale chamber inlet and having a converging apparatus for laterally urging the crop material inwardly toward the bale chamber inlet, said tine reel comprising:
    a pair of spaced-apart tine bar carriers configured to revolve about a reel axis; an elongate inboard tine bar connected to said tine bar carriers generally parallel to said reel axis, said inboard tine bar being spaced apart from said reel axis by an inboard radius and connected to said tine bar carriers in a manner allowing rotation of said inboard tine bar about a longitudinal axis thereby defining, during revolution of said tine bar carriers, a generally cylindrically-shaped periphery, said inboard tine bar disposed generally forwardly from the bale chamber inlet;
    at least one elongate outboard tine bar connected to said inboard tine bar and said tine bar carriers, said outboard tine bar aligned generally parallel to said reel axis and spaced apart from said reel axis by an outboard radius, said at least one outboard tine bar being angularly displaced about said reel axis from said inboard tine bar and positioned forwardly of the converging apparatus;
    a plurality of tines connected to and extending from said inboard tine bar and said at least one outboard tine bar, said plurality of tines having a radial extension that is varied by rotational position of said inboard and outboard tine bars;
    a cam having a cam profile configured to manage rotation of said inboard tine bar and said at least one outboard tine bar as said tine reel revolves about said reel axis; and
    a linkage interconnecting said inboard tine bar and said outboard tine bar and synchronizing said inboard tine bar rotation and said outboard tine bar rotation wherein rotation of said tine bars by said cam extends said plurality of tines outwardly from said tine reel, rotation of said tine bars in a second direction opposite from said first direction retracts said plurality of tines inwardly and wherein said angular displacement between said inboard tine bar and said at least one outboard tine bar enables said inboard and said outboard tines to be retracted at different angles of said tine reel revolution such that outboard and inboard tines follow different paths over at least a portion of their travel using a single said cam profile.

2. The tine reel of claim 1, wherein said tine reel further comprises a plurality of inboard tine bars spaced around said periphery, each of said plurality of inboard tine bars and configured in said tine reel similar to said inboard tine bar.

3. The tine reel of claim 2, wherein said inboard tine bar rotationally leads said at least one outboard tine bar.

4. The tine reel of claim 3, wherein said linkage is a fixed connection between said inboard tine bar and said at least one outboard tine bar configured such that rotation of said inboard tine bar about said longitudinal axis in said second direction causes said at least one outboard tine bar to orbit about said longitudinal axis in a manner that reduces said outboard radius.

5. The tine reel of claim 3, wherein said linkage is configured to cause simultaneous rotation of said inboard and said at least one outboard tine bar and wherein said inboard radius and said outboard radius remain constant.

6. The tine reel of claim 5, wherein said linkage is configured to cause proportional rotation of said inboard tine bar and said at least one outboard tine bar.

7. In a crop pickup apparatus for a round baler, the baler having a bale chamber inlet configured to receive crop material from the pickup apparatus, the pickup apparatus having a forwardly disposed tine reel transverse to the baler configured for lifting crop material from the ground and conveying it rearwardly toward the bale chamber inlet, the pickup apparatus being wider than the bale chamber inlet, the baler having a converging apparatus for laterally urging the crop material inwardly toward the bale chamber inlet, the improvement in the tine reel comprising:

a plurality of transversely spaced-apart tine bar carriers configured to revolve in unison about a reel axis;

an elongate inboard tine bar connected to at least two of said plurality of tine bar carriers and oriented generally parallel to said reel axis, said inboard tine bar being spaced apart from said reel axis by an inboard radius and connected to said at least two of said plurality of tine bar carriers in a manner allowing rotation of said inboard tine bar about a longitudinal axis thereby defining, during revolution of said plurality tine bar carriers, a generally cylindrically-shaped periphery, said inboard tine bar disposed generally forwardly from the bale chamber inlet;

at least one elongate outboard tine bar connected to at least two of said plurality of tine bar carriers and commonly supported with said inboard tine bar by at least one of said plurality of tine bar carriers, said outboard tine bar aligned generally parallel to said reel axis and spaced apart from said reel axis by an outboard radius, said at least one outboard tine bar being angularly displaced about said reel axis from said inboard tine bar;

a plurality of tines connected to and extending from said inboard tine bar and said at least one outboard tine bar, said plurality of tines having a radial extension that is varied by rotational position of said inboard tine bar and said at least one outboard tine bar;

a cam having a cam profile configured to manage rotation of said inboard tine bar and said at least one outboard tine bar as said tine reel revolves about said reel axis; and a linkage interconnecting said inboard tine bar and said outboard tine bar and synchronizing said inboard tine bar rotation and said outboard tine bar rotation wherein rotation of said tine bars in a first direction by said cam extends said plurality of tines outwardly from said tine reel, rotation of said tine bars in a second direction opposite from said first direction retracts said plurality of tines inwardly and wherein said angular displacement between said inboard tine bar and said at least one outboard tine bar enables said inboard and said outboard tines to be retracted at different angles of said tine reel revolution such that outboard and inboard tines follow different paths over at feast a portion of their travel using a single said cam profile.

8. The improvement of claim 7, wherein said inboard tine bar rotationally leads said at least one outboard tine bar.

9. The improvement of claim 8, wherein said linkage is a fixed connection between said inboard tine bar and said at least one outboard tine bar and configured such that rotation of said inboard tine bar in said second direction about said longitudinal axis causes said at least one outboard tine bar to orbit about said longitudinal axis in a manner that reduces said outboard radius.

10. The tine reel of claim 9, wherein said tine reel further comprises a plurality of inboard tine bars spaced around said periphery, each of said plurality of inboard tine bars and configured in said tine reel similar to said inboard tine bar.

11. The tine reel of claim 7, wherein said linkage is configured to cause simultaneous rotation of said inboard and said at least one outboard tine bar and wherein said inboard radius and said outboard radius remain constant.

12. The tine reel of claim 11, wherein said linkage is configured to cause proportional rotation of said inboard tine bar and said at least one outboard tine bar.

13. The tine reel of claim 12, wherein said tine reel further comprises a plurality of inboard tine bars spaced around said periphery, each of said plurality of inboard tine bars configured in said tine reel similar to said inboard tine bar.

14. A method for managing tine protrusion from a tine reel on a pickup for an agricultural round baler, the baler having a bale chamber inlet configured to receive crop material from the pickup apparatus, the pickup apparatus having a forwardly disposed tine reel transverse to the baler configured for lifting crop material from the ground and conveying it rearwardly toward the bale chamber inlet as the baler is moved across the ground in a forward direction, the pickup apparatus being wider than the bale chamber inlet, the baler having a converging apparatus for laterally urging the crop material inwardly toward the bale chamber inlet, comprising the steps of:

providing a plurality of transversely spaced-apart tine bar carriers configured to revolve in unison about a reel axis;

providing an elongate inboard tine bar connected to at least two of the plurality of tine bar carriers generally parallel to the reel axis, the inboard tine bar being spaced apart from the reel axis by an inboard radius and connected to the at least two tine bar carriers in a manner allowing rotation of the inboard tine bar about a longitudinal axis thereby defining, during revolution of the plurality of tine bar carriers, a generally cylindrically-shaped periphery, the inboard tine bar further being disposed generally ahead of the bale chamber inlet;

providing at least one elongate outboard tine bar connected to at least two of the plurality of tine bar carriers and commonly supported with the inboard tine bar by at least one of the plurality of tine bar carriers, the outboard tine bar aligned generally parallel to the reel axis and spaced apart from the reel axis by an outboard radius, the at least one outboard tine bar being angularly displaced about the reel axis from the inboard tine bar and disposed forward of the converging apparatus;

providing a plurality of tines connected to and extending from the inboard tine bar and the at least one outboard tine bar, the plurality of tines having a radial extension that is varied by rotational position of the inboard tine bar and the at least one outboard tine bar;

providing a cam having a cam profile configured to manage rotation of the inboard tine bar and the at least one outboard tine bar as the tine reel revolves about the reel axis;

providing a linkage interconnecting the inboard tine bar and the outboard tine bar and synchronizing tine bar rotation such that rotation of the tine bars in a first direction by the cam extends the plurality of tines outwardly from the tine reel, rotation of the tine bars in a second direction opposite from the first direction retracts the plurality of tines inwardly;

propelling the baler through a windrow of crop material to be baled; revolving, by the baler, the tine reel to lift and urge the crop material toward the bale chamber inlet;

rotating, by the cam, the inboard and the at least one outboard tine bar in the first direction to extend the plurality of tines during a first portion of the tine reel revolution;

rotating, by the cam, the inboard and the at least one outboard tine bar in the second direction to retract the plurality of tines during a second portion of the tine reel revolution, the angular displacement between the inboard tine bar and the at least one outboard tine bar causing the outboard tines to be retracted earlier in the second portion of tine reel revolution such that outboard and inboard tines follow different paths over at least a portion of their travel using a single said cam profile.

15. The method of claim 14, wherein the tine reel further comprises a plurality of inboard tine bars spaced around the periphery, each of the plurality of inboard tine bars configured in the tine reel similar to the inboard tine bar.

16. The method of claim 15, wherein the inboard tine bar rotationally leads the at least one outboard tine bar.

17. The method of claim 16, wherein the linkage is a fixed connection between the inboard tine bar and the at least one outboard tine bar and configured such that rotation of the inboard tine bar in said second direction about the longitudinal axis causes the at least one outboard tine bar to orbit about the longitudinal axis in a manner that reduces the outboard radius.

18. The method of claim 16, wherein said linkage is configured to cause simultaneous rotation of said inboard and said at least one outboard tine bar and wherein said inboard radius and said outboard radius remain constant.

19. The method of claim 18, wherein said linkage is configured to cause proportional rotation of said inboard tine bar and said at least one outboard tine bar.

* * * * *